United States Patent [19]

Venken et al.

[11] 4,292,473
[45] Sep. 29, 1981

[54] LOOP SUPERVISION CIRCUIT

[75] Inventors: Jan H. G. Venken, Schilde; Jozef A. M. Robijns, Heers, both of Belgium

[73] Assignee: International Standard Electric Corporation, New York, N.Y.

[21] Appl. No.: 64,344

[22] Filed: Aug. 6, 1979

[51] Int. Cl.³ .................... H04M 3/02; H04M 3/22
[52] U.S. Cl. ............................................ 179/18 FA
[58] Field of Search ......... 179/18 F, 18 FA, 175.3 R, 179/18 HB, 81 R, 16 EA, 16 F, 17 E

[56] References Cited

U.S. PATENT DOCUMENTS

| | | | |
|---|---|---|---|
| 2,892,037 | 6/1959 | Feiner | 179/18 |
| 3,205,312 | 9/1965 | Brightman et al. | 179/18 F |
| 3,478,175 | 11/1969 | Herter | 179/18 FA |
| 3,525,816 | 8/1970 | Herter | 179/18 FA |
| 3,748,395 | 7/1973 | Herter | 179/18 FA |
| 3,772,477 | 11/1973 | Richards | 179/18 FA |
| 4,099,032 | 7/1978 | Roge et al. | 179/18 FA |

FOREIGN PATENT DOCUMENTS 688760  10/1966  Belgium .

OTHER PUBLICATIONS

Article—Balanced Electronic Receiver for Loop Signaling, D. Fishbuch, E. Herter—vol. 44 No. 4, 1969, pp. 340-347, Electrical Communications.
Article—General Second Order Twin-T and Its Application to Frequency-Emphasizing Networks, E. Leuder, Bell System Technical Journal, vol. 51, No. 1, Jan. 1972, pp. 301-316.

*Primary Examiner*—Thomas A. Robinson
*Attorney, Agent, or Firm*—James B. Raden; Marvin M. Chaban

[57] ABSTRACT

An impedance network used for ring trip or loopsupervision purposes in a telecommunications system. The network employs a multi-port impedance bridge with one set of opposed terminals (first port) coupled to the line loop being supervised and the opposed terminals (second port) coupled to an AC ringing source. A third port is coupled to intermediate points in the impedance of opposite bridge legs. The third port leads to a low pass filter network and ultimately to a DC detection circuit. The third port is also coupled through impedances to the AC source to receive an attenuated AC component signal to cancel any stray AC components entering the detection circuit.

21 Claims, 2 Drawing Figures

LOOP SUPERVISION CIRCUIT

BACKGROUND OF THE INVENTION

The present invention relates to an impedance network including a source having a DC component and an AC component, a variable resistance, a DC detector circuit to ascertain changes in the value of said resistance, terminals of all three means being coupled to distinct ports of a multi-port network, and a filter circuit associated to said DC detector circuit to substantially prevent said AC component from having an influence on the operation of said DC detector circuit which has at least one further terminal at a fixed DC potential.

Such a network is already known from Belgian Pat. No. 688 760 (E. HERTER). This known network is a telephone ring-trip circuit arranged in a telephone exchange and including a multi-port network comprising a bridge circuit with a first port able to be connected to a telephone subscriber station via a telephone line, with a second port connected to a source having a DC component and an AC or ringing component and with a third port, the terminals of which are connected to the base and emitter of a normally non-conductive transistor DC detector having a collector or further terminal at a fixed potential. The base and emitter of this transistor DC detector are coupled to ground via respective (shunt) capacitors which form together with (series) resistances of the bridge circuit a filter circuit for the AC or ringing component.

After a call initiated by a telephone subscriber has been detected in the telephone exchange and the dialled telephone number of a called subscriber has been obtained, the above mentioned source is connected via the bridge circuit to a telephone line leading to the called subscriber station and a ringing device is operated therein by means of the AC or ringing component applied thereat. When the called subscriber subsequently takes off his telephone handset a line loop including the called subscriber station and the telephone line is closed from a DC viewpoint so that the resistance connected to the first port of the transistor DC detector is sharply reduced. As a consequence the transistor DC detector then becomes conductive, thus indicating that ringing can be terminated. In principle, the filter circuit operates in such a way that the ringing component has no influence on the condition of the detector transistor. However, it has been experienced that due to tolerances on the values of the capacitors and the resistances the filtered AC signals applied to the base and emitter electrodes of the transistor DC detector may have such a phase shift and amplitude that the transistor can be instantaneously switched on and off under the sole influence of these AC signals. This is obviously a drawback because the operation of the detector circuit should be only dependent on the DC variations at its input port.

SUMMARY OF THE INVENTION

An object of the present invention is therefore to provide an impedance network of the above type but which does not present this drawback.

According to the invention this object is achieved due to the fact that a further terminal is coupled to said source in such a way that its potential also has an AC component cancelling the effect of any AC signal present on the terminals of an input port of said DC detector circuit coupled to a port of said multi-port network.

In this way it is possible to vary the AC component at said further terminal in such a manner that said DC detector circuit only reacts to DC variations at its input port.

Other features of the present impedance network are that said DC detector is a differential amplifier, that this amplifier includes two three-terminal amplifier circuits with individual input terminals forming said input port and with interconnected first and interconnected second output terminals forming said output port, and that each of said three-terminal amplifier circuits comprises a transistor the base of which constitutes a distinct one of said individual input terminals and the emitter and collector electrodes of which constitute said first and second output terminals.

It should be noted that an impedance network including a DC detector comprising a differential amplifier with two transistors is already known from U.S. Pat. Nos. 3,525,816 and 3,748,395 (both E. H. HERTER).

Further features of the present impedance network are that said DC detector circuit is coupled to said multi-port network via said filter circuit which is a lowpass filter circuit the higher rejection frequency band of which includes the frequency of said AC component of said source and that said lowpass filter circuit comprises a parallel T-network across the output of which a parallel RC circuit is connected.

In accordance with a preferred embodiment of the invention the present impedance network includes a bridge circuit with two opposite first branches each comprising a potentiometer circuit and with two opposite second branches each comprising a resistance, said bridge circuit having a first port which is formed by a pair of first bridge terminals and which is able to be coupled to a telephone station via a telephone line, said bridge circuit having a second port which is formed by a pair of second bridge terminals and which is coupled to the non-interconnected first poles of a DC source connected in series with a ringing source, and said bridge circuit having a third port which is formed by tapping points of the potentiometer circuits and which is coupled via a parallel T-filter network, across the output of which a parallel RC circuit is connected, to the bases of two PNP transistors interconnected in a differential amplifier configuration, the common emitters and the common collectors of these transistors being connected to the junction point of a first pair and a second pair of diodes having their cathodes and their anodes connected to each other respectively. The anodes of the diodes of the first pair are connected to the first poles of the DC and AC sources respectively, whilst the cathodes of the diodes of the second pair are connected to the second pole of the DC source and to the tapping point of a potentiometer shunting the ringing source.

By a suitable choice of the components the bias signals thus applied to the emitters and collectors of both the transistors are such that the condition of these transistors is not influenced by the ringing signals applied to their bases.

The present invention also relates to a telecommunication loop supervision circuit. It is characterized in that it includes an impedance network such as described above and that the variable resistance is formed by a telecommunication line coupling the multi-port network to a subscriber station, the above mentioned AC component being generated by a ringing signal source.

The above mentioned and other objects and features of the invention will become more apparent and the invention itself will be best understood by referring to the following description of an embodiment taken in conjunction with the accompanying drawing wherein:

DETAILED DESCRIPTION

This impedance network includes a multi-port network or bridge circuit BC, a filter circuit FC, a DC detector circuit DC and a clamping circuit CC.

The bridge circuit BC has two opposite first branches comprising a potentiometer T1 and T2 with resistors R1, R2 and R3, R4 respectively and two opposite second branches each comprising a so-called feed resistor R. The bridge circuit BC further has a first port PQ formed by two first bridge terminals P and Q, a second port SU formed by two second bridge terminals S and U, and a third port MN formed by tapping points M and N of the potentiometers T1 and T2 respectively.

The terminals Q and P of the first port PQ are able to be connected to a telephone station such as TS via switching means SM1, SM2 and a telephone line comprising a pair of wires L1, L2. This telephone station TS includes amongst other circuitry (not shown) a parallel circuit having a first branch comprising a capacitor CS and a ringer RI connected in series and a second branch comprising a hook switch HS of a telephone handset (not shown) and a resistor RS also connected in series.

Figure 1:
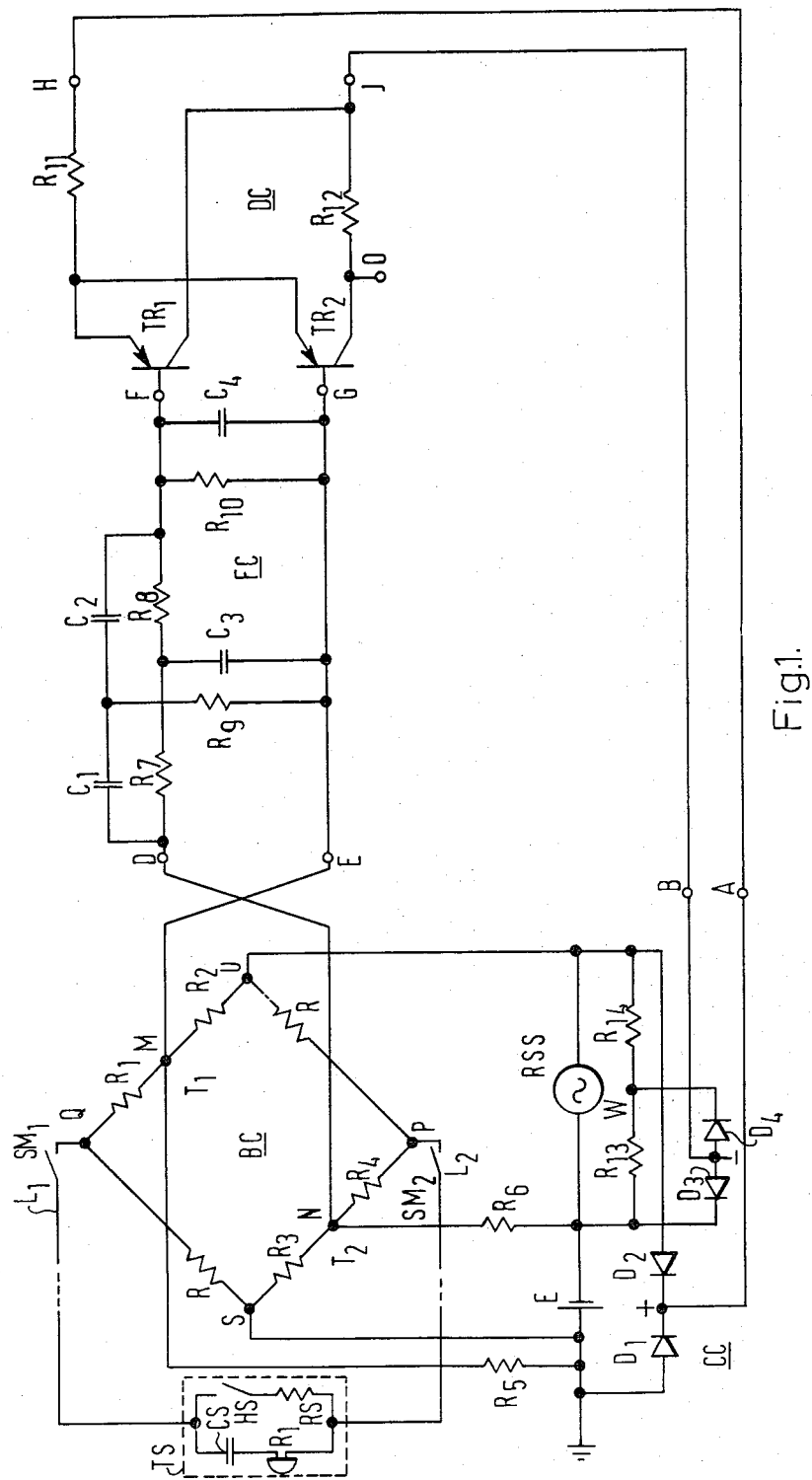
FIG. 1 represents an impedance network according to the invention.
Figure 2:
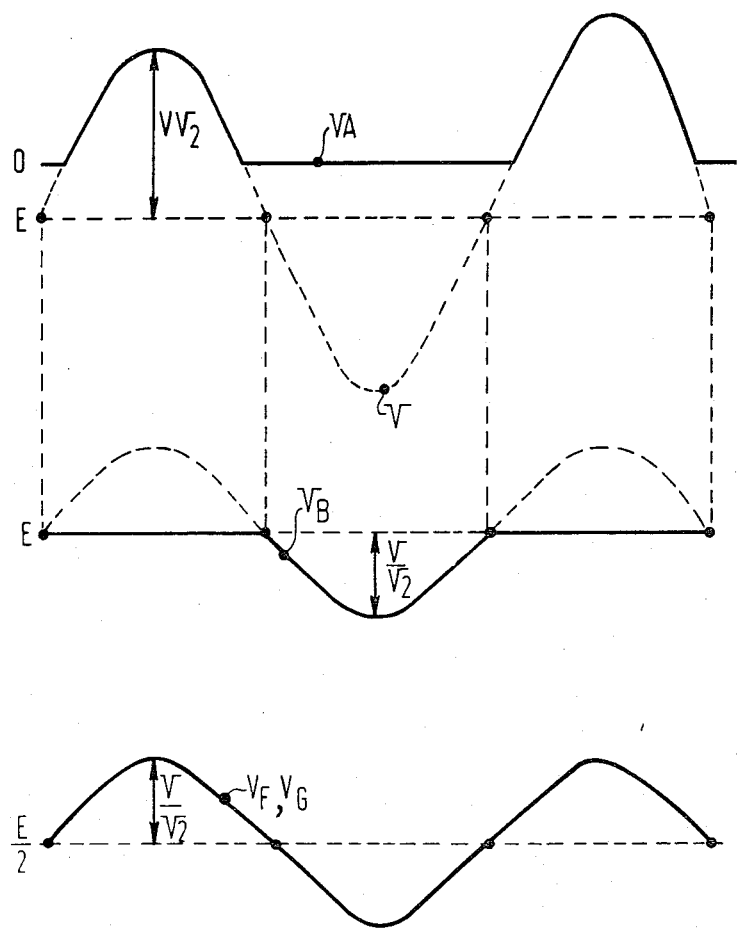
FIG. 2 shows signal waveforms appearing at terminals A, B, F and G of FIG. 1.

The terminal S of the second port SU is connected to the grounded positive pole of a DC source E the negative pole of which is connected to a pole of a ringing signal source RSS so that both these sources are connected in series thus forming in fact a single source with a DC component E and an AC component RSS and providing a DC voltage E and an effective ringing signal V respectively (FIG. 2). The terminal U of the second port is connected to the pole of the ringing signal source RSS which is not connected to the negative pole of the DC component E.

The terminals M and N of the third port MN are connected, on the one hand, to the terminals E and D of the filter circuit FC and, on the other hand, to the positive and negative poles of the DC source E via resistors R5 and R6 respectively.

As mentioned in the above mentioned Belgian patent the particular advantage of the bridge circuit is to compensate for the longitudinal voltages induced in the telephone line L1, L2.

The filter circuit FC has input terminals D and E which are connected to the output terminals N and M of the bridge circuit port MN respectively and output terminals F and G which are connected to the DC detector circuit DC. This filter circuit FC includes a well known parallel T-network, comprising resistors R7, R8, R9 and capacitors C1, C2, C3 and an RC circuit connected across the output of the parallel T-network and comprising resistor R10 connected in parallel with capacitor C4.

The values of the components have been so chosen that $R_7 = R_8$; $C_1 = C_2$ and $R_7 \cdot C_3 = 4R_9 \cdot C_1 = 2T_2$ so that the transfer function of the filter circuit FC may then be written:

$$\frac{V_F - F_G}{V_N - V_M} = \frac{1 + p^2 T_1^2}{1 + p\dfrac{T_0}{Q_0} + p^2 T_0^2} \cdot \frac{R_{10}}{R_7 + R_8 + R_{10}}$$

wherein $T_0^2 = \dfrac{T_2 \cdot R_7 \cdot R_{10} \cdot (C_1 + 2C_4)}{2R_7 + R_{10}}$ $T_1^2 = T_2 \cdot C_1 \cdot R_7$ $Q_0 = \dfrac{\sqrt{(R_{10} + 2R_7) \cdot (C_1 + 2C_4) \cdot T_2 \cdot R_7 \cdot R_{10}}}{2T_2 \cdot (R_7 + R_{10}) + 2R_7 \cdot R_{10} \cdot (C_1 + C_4)}$ $T_2 = 2C_1 \cdot R_9 = \dfrac{C_3 \cdot R_7}{2}$ $p = jf$, f being the frequency.

Due to the presence of the parallel circuit R10, C4 the filter circuit FC is a lowpass filter which considerably attenuates the ringing signal having a frequency $f_3$ and relatively high amplitude peak values as well as spurious signals of higher frequencies, the highest attenuation being produced at a frequency $f_1 = 1/T_1$.

Because the value of this frequency $f_1$ may vary with the tolerance variations of the values of the various components the frequency $f_1$ has been so chosen that in all circumstances it remains close to the frequency $f_3$ of the ringing signal. Thus, it is ensured that the latter signal is substantially completely attenuated independently from the tolerance variations of the values of the components. This means that the AC voltage waveform at output terminal F substantially has the same amplitude and phase as the AC voltage waveform at output terminal G.

Due to the presence of the parallel circuit R10, C4 the filter circuit FC produces a phase inversion which does not occur at the frequency $f_1$, as is normally the case with a parallel T-network, but at a frequency $f_0 = 1/T_0$. Again because the value of this frequency $f_0$ may vary with the tolerance variations of the values of the components the frequency $f_0$ has been so calculated that in all circumstances it remains considerably smaller than the frequency f of the ringing signal. Thus it is ensured that the phase inversion does not occur at the ringing frequency or at higher frequencies.

From the above it follows that the higher rejection frequency band of the lowpass filter circuit FC includes the frequency f of the ringing signal and is different from the frequency $f_0$ at which the filter circuit produces a 180° phase inversion between the signal $V_N - V_M$ applied at its input D, E and the signal $V_F - V_G$ appearing at its output F, G.

The DC detector circuit DC is constituted by a differential amplifier comprising two PNP transistors TR1 and TR2 the bases of which are connected to corresponding output terminals F and G of the filter circuit. The emitters of these transistors TR1 and TR2 are connected to output terminal A of the clamping circuit CC via a relatively large common resistance R11 and output terminal H, whilst the collectors of these transistors are connected to output terminal B of this clamping circuit CC via output terminal J and via resistor R12 and this output terminal J respectively. The collector of the transistor TR2 is the output terminal O of the circuit. Use is made of a differential amplifier because it has a high input impedance so that the base current of either the transistor TR1 or TR2 does not substantially affect either the bridge circuit BC or the filter circuit FC. On the other hand this base current is substantially constant because either transistor TR1 or TR2 is conductive.

The purpose of the detector circuit DC is to detect a DC voltage inversion between the output terminals M and N of the bridge circuit BC upon a called subscriber hooking off his telephone handset hereby closing hook-switch contact HS, i.e. upon the resistance of the circuit connected to the port QP being modified.

The clamping circuit CC includes two pairs of diodes D1, D2 and D3, D4,. The interconnected cathodes of the diodes D1 and D2 are connected to output terminal A of the clamping circuit CC, whilst their anodes are connected to ground and to the pole of the ringing signal source RSS which is not connected to the DC source respectively. The DC voltage at the anode of the diode D2 is equal to E Volts, whilst the effective AC voltage at this point is equal to V Volts so that the clamped voltage VA (FIG. 2) provided at output terminal A and applied to the emitters of the transistors TR1 and TR2 is constituted by positive going half wave portions varying between a minimum of 0 Volt and a maximum of $E+V\sqrt{2}$ Volts (FIG. 2). The interconnected anodes of the diodes D3 and D4 are connected to output terminal B of the clamping circuit CC, whilst their cathodes are connected to the negative pole of the DC source E and to a tapping point W of series connected resistors R13 and R14 respectively. These resistors R13, R14 are branched across the ringing signal source RSS and are of equal value. The DC voltage at their junction point W is equal to E Volts, whilst the effective AC voltage at this point is equal to V/2 Volts so that the clamped voltage VB provided at output terminal B and applied to the collectors of the transistors TR1 and TR2 is constituted by negative going half wave portions varying between a maximum of E Volts and a minimum of $E-V/\sqrt{2}$ Volts (FIG. 2).

From the above it follows that as shown in FIG. 2:

during the positive going half waves of the ringing signal V the voltage $V_B$ at the collectors of the transistors TR1 and TR2 is equal to E Volts, whereas it follows that this voltage $V_B$ varies between E Volts and $E-V/\sqrt{2}$ Volts during the negative going half waves of this ringing signal V;

during upper portions of the positive going half waves of the ringing signal the voltage $V_A$ at the emitters of the transistors TR1 and TR2 follows these portions, whilst during the remaining portions of these positive going half waves and during the negative going half waves of the ringing signal V these emitters are at 0 Volt.

Preferred values of the components of the above circuit are as follows:

R = 0.2 kilo-ohms;
R1 = 27 kilo-ohms;
R2 = R3 = R4 = 30 kilo-ohms;
R5 = R6 = 300 kilo-ohms;
R7 = R8 = 16.2 kilo-ohms;
R9 = 8.9 kilo-ohms;
R10, R11 = 100 kilo-ohms;
R12, R13 = R14 = 10 kilo-ohms;
C1 = C2 = 0.68 micro-Farad;
C3 = 1.5 micro-Farad;
C4 = 1 micro-Farad
f = 16 Hz
V = 90 Volts
E = −48 Volts
$T_2$ = a time constant as defined by equation herein.

The operation of the above described circuit is described hereinafter.

In the rest condition of the circuit, i.e. when the hook switch HS in the subscriber station TS is open, the difference between the DC voltages at the filter circuit output terminals F and G is different from zero and equal to a predetermined bias value. With the above given values of the components this bias value is such that the DC voltage signal at terminal F which is connected to the base of transistor TR1 is smaller than that at terminal G which is connected to the base of transistor TR2. The ringing signal source RSS is supposed to be in operative condition and therefore applies the ringing signal V having frequency f and effective voltage value V between the terminals S and U of the bridge circuit BC in series with the DC voltage E. This ringing signal V also appears, attenuated, at the bridge output port MN and from this port it is applied to the bases G and F of the detector transistors TR1 and TR2 via the filter circuit FC. Due to the fact that the total voltage $V_F$ at terminal F is smaller than the total voltage $V_G$ at terminal G and that the emitters and collectors of these transistors $TR_1$ and $TR_2$ vary between 0 and $E+V\sqrt{2}$ Volts and between E and $E-V/\sqrt{2}$ Volts respectively (FIG. 2), the transistor $TR_1$ becomes conductive, whereas the transistor $TR_2$ is blocked so that the output O of the circuit is de-activated.

On FIG. 2 the signals $V_F$ and $V_G$ are both shown to be equal to E/2+V/2 when the impedance connected to the port QP is infinite although they slightly differ, this difference being sufficient to make transistor $TR_1$ conductive and to hold transistor $TR_2$ in the blocked condition.

It should be noted that a filter circuit such as FC providing a high attenuation of the ringing signal and of signals having higher frequencies is used because the ringing signal has a relatively high amplitude and because spurious signals having such higher frequency may be applied to it.

When a call initiated by a telephone subscriber has been detected in the telephone exchange and the dialled telephone number of a called subscriber station such as TS has been obtained and this station has been found, the switching means $SM_1$ and $SM_2$ are operated to connect the bridge circuit port QP to this telephone station TS via the telephone line $L_1$, $L_2$. Hereby the transistors $TR_1$ and $TR_2$ remain in the conductive and not conductive condition respectively.

The latter conditions of the transistors $TR_1$ and $TR_2$ are not influenced by the AC voltage signals $V_F$ and $V_G$ applied to their bases respectively. Indeed (FIG. 2):

during the positive going half waves of the voltage signal $V_F$ which is applied to the base of the conductive PNP transistor TR1 and which tends to block this transistor the collector thereof is at E Volts, whilst its emitter is either at 0 Volts or varies together with this base voltage. The emitter voltage $V_A$ however always remains larger than the latter base voltage $V_F$ so that TR1 remains conductive;

during the negative going half waves of the voltage signal $V_G$ which is applied to the base of the non-conductive PNP transistor TR2 and which tends to make this transistor conductive the emitter thereof is at 0 Volt, whilst its collector varies together with this base voltage but remains smaller than the latter so that TR2 remains non-conductive.

It should be noted that the AC voltage signal on the collectors has been reduced by making use of the resistors R13 and R14 in order that the transistors TR1 and TR2 should not be subjected to too high an emitter-collector voltage.

Because the effect of the AC signals on the bases of the transistors TR1 and TR2 is cancelled by suitable compensating AC signals being applied to their emitters and collectors, as shown in FIG. 2, it is clear that it is imperative that no phase inversion should occur in the ringing signal f applied to the bases of these transistors. This is the reason why the ringing signal frequency f is well above the above mentioned frequency $f_0$ at which such phase inversion is produced in the filter circuit FC.

When the called subscriber upon receiving the ringing signal hooks off his telephone handset the line loop is closed, from a DC viewpoint, due to the hookswitch HS being then closed. As a consequence and due to the fact that the line loop impedance then decreases below a predetermined value the voltage $V_G$ decreases below the voltage $V_F$ by such a value that the transistor TR2 becomes conductive whilst the transistor TR1 becomes blocked.

When the transistor TR2 becomes conductive the output terminal O of the circuit is activated and this increased voltage is used to open the switching means SM1 and SM2 in a not shown but obvious way.

Although not absolutely necessary, diodes can be inserted between the resistor 11 and the emitters of the transistors TR1 and TR2 in order to protect these transistors when for instance the clamping circuit CC is defective.

While the principles of the invention have been described above in connection with specific apparatus, it is to be clearly understood that this description is made only by way of example and not as a limitation on the scope of the invention.

We claim:

1. Impedance network for monitoring the condition of a line, said network including a source having a DC component and an AC component, a DC detector circuit, a multiport impedance bridge network, said line coupled to one port of said bridge network, said source coupled to the opposed port of the bridge network and said detector circuit coupled to an output port of said bridge network formed by intermediate tapping of impedances in opposed arms of said bridge network, a filter circuit associated with said DC detector circuit to substantially prevent said AC component from having an influence on the operation of said DC detector circuit, said detector circuit having at least one terminal at a fixed DC potential, the invention wherein said terminal is coupled to said source to apply a potential having an AC component to the detector circuit cancelling the effect of any AC signal present on the terminals of an input port to said DC detector circuit from said bridge network.

2. Impedance network according to claim 1, wherein the applied AC potential component is derived from the AC component of said source.

3. Impedance network according to claim 2, wherein said applied AC potential component is derived from said AC component of said source, and in which there is a clamping circuit for clamping a signal proportional to said AC component at a value derived from said DC component.

4. Impedance network according to claim 1, wherein said DC detector circuit comprises a differential amplifier.

5. Impedance network according to claim 1, wherein said DC detector circuit has said input port and an output port comprising two terminals to each of which said AC potential component is applied.

6. Impedance network according to claim 4, wherein said differential amplifier includes two three-terminal amplifier circuits with individual input terminals forming said detector input port and with interconnected first and interconnected second output terminals forming said output port.

7. Impedance network according to claim 6, wherein each of said three-terminal amplifier circuits comprises a transistor, the base of each of said transistors constituting a distinct one of said individual input terminals and the emitter and collector electrodes of each constituting said first and second output terminals.

8. Impedance network according to claim 1, wherein said DC detector circuit is coupled to said multiport bridge network via said filter circuit which is a low pass filter circuit, the higher rejection frequency band of which includes the frequency of said AC component of said source.

9. Impedance network according to claim 8, wherein said low pass filter circuit is a rejection filter with attenuation above a predetermined minimum at infinite frequency.

10. Impedance network according to claim 8, wherein said low pass filter circuit only includes resistors and capacitors.

11. Impedance network according to claim 8, wherein said low pass filter circuit comprises a parallel T-network across the output of which a parallel RC circuit is connected.

12. Impedance network according to claim 11, wherein the frequency of said AC potential component is different from the frequency at which said filter circuit produces a 180° phase inversion between the signal applied at its input port and that appearing at its output port.

13. Impedance network according to claim 1, wherein the multi-port network is a bridge circuit with two opposite first branches each comprising a resistive potentiometer and with two opposite second branches each comprising a resistance, said bridge circuit one port being formed by a pair of first bridge terminals which are coupled to said variable resistance, said opposed port being formed by a pair of second bridge terminals which are coupled to said source and said output being formed by tapping points of said potentiometer circuits and which is coupled to said DC detector.

14. Impedance network according to claim 13, wherein said source comprises a DC source and an AC source, which are connected in a series combination.

15. Impedance network according to claim 14, wherein said DC detector includes two transistors, the bases of said transistors being coupled to the junction of the poles of said sources intermediate in said combination via further resistances which are much larger than those forming part of said bridge network.

16. Impedance network according to claim 15, wherein the first and second output terminals of said transistors are coupled to the junction point of the first electrodes of the diodes of a first and second pair of diodes respectively, the second electrodes of one of the diodes of said first and second pairs being connected to the poles of said DC source respectively and the second electrodes of the other of the diodes of said first and second pairs being coupled to the poles of said AC source.

17. Impedance network according to claim 16, wherein the second electrodes of the other of the diodes of said first and second pairs are coupled to a pole of said AC source directly and via one of the resistances of a potentiometer shunting said AC source respectively.

18. A loop supervision circuit for a telephone line comprising a resistive bridge network with a port to said line coupled to a pair of opposed terminals of the bridge, a source of AC ringing current coupled to the other terminals of said bridge, and a loop condition detecting circuit coupled to intermediate points in the resistive opposed legs of the bridge, detection means in said detecting circuit, a low pass filter in said detecting circuit to prevent ring current from said source from reaching said detection means, and in which said intermediate points are coupled to said AC source to produce an attenuated AC component signal for counteracting any AC signal reaching said detection means.

19. A loop supervision circuit as claimed in claim 18, in which said detection means comprises a differential amplifier.

20. A loop supervision circuit as claimed in claim 19, in which said differential amplifier includes a first and a second transistor with the base of each transistor coupled to an output of said filter.

21. An impedance network including a bridge circuit with two opposite first branches each comprising a potentiometer circuit and with two opposite second branches each comprising a resistance, said bridge circuit having a first port which is formed by a pair of first bridge terminals and which is adapted to be coupled to a telephone station via a telephone line, said bridge circuit having a second port which is formed by a pair of second bridge terminals and which is coupled to the noninterconnected first poles of a DC source connected in series with a ringing source, and said bridge circuit having a third port which is formed by tapping points of the potentiometer circuits and which is coupled via a parallel T-filter network, across the output of which a parallel RC circuit is connected, to the bases of two PNP transistors interconnected in a differential amplifier configuration, the common emitters and the common collectors of these transistors being connected to the junction points of a clamping circuit, said clamping circuit being connected to the first poles of the DC and AC sources and being connected to the second pole of the DC source and to the tapping point of a potentiometer shunting the ringing source.

* * * * *